United States Patent [19]

Sato et al.

[11] Patent Number: 5,275,637
[45] Date of Patent: Jan. 4, 1994

[54] METHOD OF MANUFACTURING A GLASS OPTICAL PART

[75] Inventors: Bunryo Sato, Hachioji; Nobukazu Yogo, Yokohama; Hiroe Tanaka, Tokyo; Takeshi Nomura, Tokyo; Hiroyuki Kubo, Tokyo, all of Japan

[73] Assignee: Canon Kabushiki Kaisha, Tokyo, Japan

[21] Appl. No.: 645,633

[22] Filed: Jan. 25, 1991

[30] Foreign Application Priority Data

Jan. 31, 1990 [JP] Japan ............................. 2-19339
Jan. 31, 1990 [JP] Japan ............................. 2-19340
Feb. 19, 1990 [JP] Japan ............................. 2-36276

[51] Int. Cl.⁵ .................. C03B 11/05; B29D 11/00
[52] U.S. Cl. ................................. 65/66; 65/123; 65/303; 65/305; 264/1.1; 264/163
[58] Field of Search ............ 65/28, 29, 66, 123, 65/305, 133, 122, 127, 223, 226, 207, 303; 264/1.1, 163, 161

[56] References Cited

U.S. PATENT DOCUMENTS 3,306,723  2/1967  Forber ........................... 65/127

FOREIGN PATENT DOCUMENTS 63-248727 10/1988 Japan .
1-133948   5/1989 Japan .
1-145337   6/1989 Japan ........................... 65/66
1-212239   8/1989 Japan ........................... 65/66
1224234    9/1989 Japan ........................... 65/66

Primary Examiner—Karen M. Hastings
Attorney, Agent, or Firm—Fitzpatrick, Cella, Harper & Scinto

[57] ABSTRACT

A method of pressing flowing-down molten glass from the opposite sides thereof by a pair of shaping mold members to thereby manufacture a glass optical part having surfaces corresponding to the shaping surfaces of the mold members is characterized in that a groove forming ring is provided around the shaping surface of at least one of the shaping mold members, a groove is formed in the molten glass by the groove forming ring during the press and the flowing-down molten glass is cut above that portion thereof which is being pressed, thereby obtaining a glass molded article having an ear protruding outwardly of the groove relative to an optical part body portion.

9 Claims, 8 Drawing Sheets

METHOD OF MANUFACTURING A GLASS OPTICAL PART

BACKGROUND OF THE INVENTION

1. Field of the Invention

This invention relates to a method of manufacturing a glass optical part, and in particular to a method of obtaining an optical part by pressing glass in its molten state from the opposite sides thereof by shaping mold members while causing the glass to flow down.

2. Related Background Art

As methods of obtaining an optical part from a glass blank by press molding, there are the so-called reheat press method and direct press method.

In the reheat press method, a glass blank similar in shape to a final molded article is once formed, and this blank is contained in a shaping mold apparatus and heated and pressed to thereby obtain a final molded article corresponding to the shape of a cavity formed by the mold member of the mold apparatus.

In the direct press method, molten glass is introduced into a shaping mold apparatus and pressed to thereby directly obtain a final molded article corresponding to the shape of a cavity formed by the mold member of the mold apparatus.

Now, the glass blank used in the above-described reheat press method should preferably be good to some degree in shape accuracy and surface accuracy and therefore, the glass blank is ground and polished in some cases to obtain a final product of predetermined accuracy. However, this requires time and labor for grinding and polishing and thus, in some cases, the above-described direct press method is utilized to manufacture said glass blank.

As the direct press method, there is a system as described, for example, in Japanese Laid-Open Patent Application No. 63-248727 and Japanese Laid-Open Patent Application No. 1-133948 wherein molten glass is sandwiched from the opposite sides thereof by the use of a pair of shaping mold members horizontally opposed to each other while the molten glass is caused to flow down from a nozzle, and the glass is cooled and cured in a cavity thus formed, thereby obtain a molded article of a predetermined shape. In this system, a ring-like cutting member is disposed around the optical surface shaping surface of one of the shaping mold members and this cutting member is moved forward simultaneously with or after the forward movement of the mold members to thereby cut and remove the protruding portion of the glass and form an optical part of a desired shape. This system is preferable in that an optical part can be obtained without the cutting traces of the flowing-down molten glass remaining on the optical surface.

However, in the above-described system, when the glass is cut by the ring-like cutting member, dust may be created by the contact of the cutting member with the other mold member and such dust may adhere to the shaping surfaces of the mold members after the parting of the molded article and may further adhere to the glass surface which will provide the optical surface during the next press, thereby deteriorating the optical characteristic of the molded article.

Further, as described above, the ring-like cutting member contacts with the other mold member and therefore is short in life and frequent replacement thereof is necessary, and this has hampered improvements in the manufacturing efficiency.

SUMMARY OF THE INVENTION

In view of the prior art as described above, the present invention has as its object the provision of a method of manufacturing a glass optical part, which method can obtain an optical part of good optical characteristic and can improve the manufacturing efficiency.

BRIEF DESCRIPTION OF THE DRAWINGS

FIGS. 1A-1D being cross-sectional views schematically showing the steps of an embodiment of a method of manufacturing a glass optical part according to the present invention, FIG. 2 being a front view showing a molded article, FIG. 3 being a fragmentary schematic cross-sectional view thereof, FIG. 4 being a fragmentary schematic cross-sectional view showing the body portion of an optical part having its ear removed, FIG. 5 being a cross-sectional view showing a modification of the method of manufacturing a glass optical part according to the present invention, FIGS. 6 and 7 being schematic cross-sectional views showing examples of groove forming rings.

DESCRIPTION OF THE PREFERRED EMBODIMENTS

Figure 1A:
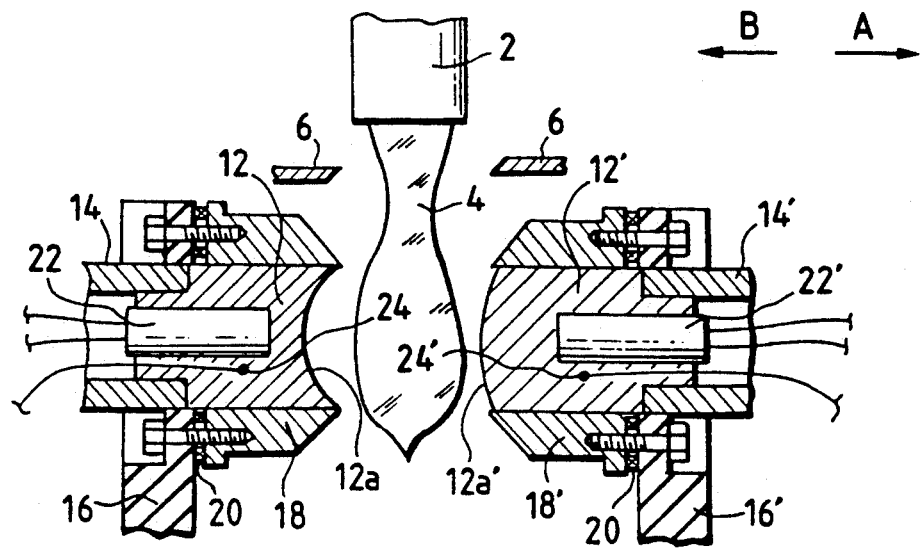
FIGS. 1A-1D, 2 to 7 show a first form in which the present invention is carried out.

A first form in which the present invention is carried out will hereinafter be described with reference to the drawings.

FIGS. 1A-1D are cross-sectional views schematically showing the steps of an embodiment of a method of manufacturing a glass optical part according to the present invention.

In these figures, the reference numeral 2 designates a molten glass outflow nozzle connected to a glass melting apparatus, not shown, and the reference numeral 4 denotes molten glass caused to continuously flow down from the nozzle 2. The reference numeral 6 designates a shearing machine (cutting edge) disposed just beneath the nozzle 2 for cutting the flowing-down molten glass 4 at suitable timing.

The reference numerals 12 and 12' denote a pair of shaping mold members disposed on the opposite sides of the flowing-down molten glass, and in the present embodiment, the shaping mold members 12 and 12' are for shaping a convex meniscus lens. The reference characters 12a and 12a' designate shaping surfaces for forming the optical surfaces of the convex meniscus lens. The shaping surfaces 12a and 12a' are finished as mirror surfaces. These mold members are of a rotation symmetrical shape and are disposed coaxially with each other with their shaping surfaces opposed to each other.

A pair of mold sets are constructed including the mold members 12 and 12'.

In the left mold set, the shaping mold member 12 is fixed to a support member 14 which is mounted on a mounting member 16. A groove forming ring 18 is mounted around the mold member 12. The end of this ring 18 is made into a cutting edge shape. The ring 18 is fixed to the mounting member 16 by means of a bolt with a spacer ring 20 interposed therebetween. The projection amount of the cutting edge of the ring 18 from the shaping surface 12a of the mold member 12 is set in conformity with the thickness of the spacer ring.

A heater 22 and a thermocouple 24 for temperature measurement are contained in the mold member 12.

Although not shown, the mounting member 16 is supported by a base stand, not shown, for reciprocal movement in the directions of arrows A and B. This reciprocal movement is effected by driving means, not shown, and the foremost stop position in the direction A is set by a stopper, not shown. By making the position of this stopper variable and adjusting the position thereof, said stop position can be suitably set.

While the left mold set has been described above, the right mold set is substantially the same as the left mold set except the shape of the shaping surface 12a' of the mold member 12', and corresponding members have a prime (') attached thereto.

The manufacturing process will hereinafter be described with reference to the drawings.

First, as shown in FIG. 1A, the left and right mold sets are opened at a predetermined interval and the molten glass 4 is caused to flow down from the nozzle 2 into the space between the mold members 12 and 12' while the shearing machine 6 is maintained open. Then, the arrival of the lower end of the molten glass 4 at the downstream of the space between the mold members as shown in FIG. 1A is detected by a sensor, not shown.

Figure 1B:
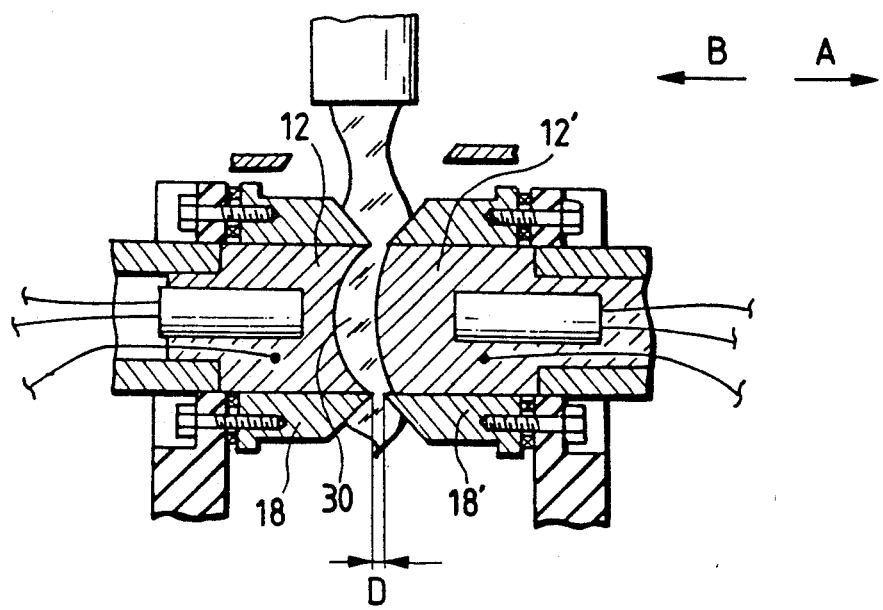

Subsequently, on the basis of the detection signal, the right mold set is advanced in the direction B until it bears against the stopper. With a very slight delay relative to this advancement, the left mold set is advanced in the direction A until it bears against the stopper. Thereby, as shown in FIG. 1B, the molten glass is pressed correspondingly to a cavity formed by the pair of mold members 12, 12' and the pair of groove forming rings 18, 18'. At this time, as shown in FIG. 1B, the ends of the groove forming rings 18 and 18' are not in contact with each other but are spaced apart from each other by a spacing D and accordingly, on the left and right surfaces of the pressed molten glass, there are formed grooves around the portions thereof corresponding to the shaping surfaces 12a and 12a' of the mold members. Thus, a glass optical part body portion 30 is formed inside the grooves.

Figure 1C:
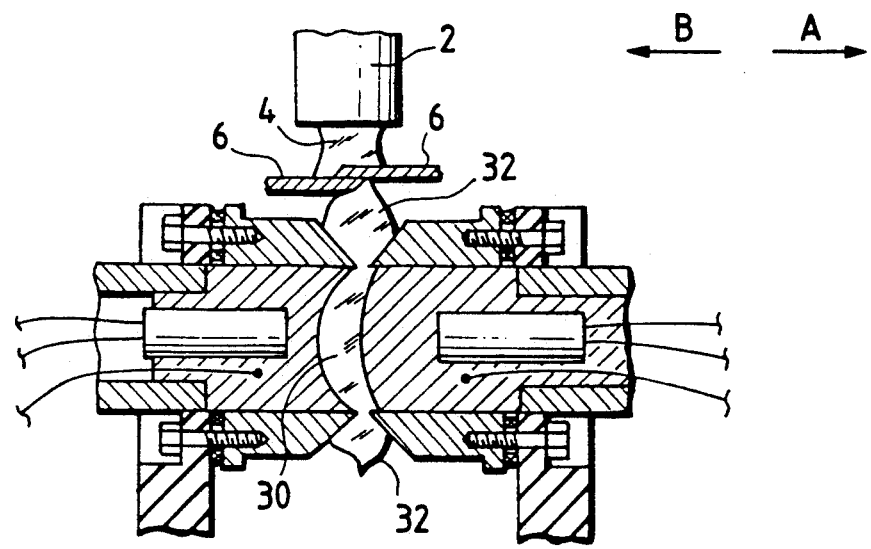

Subsequently, as shown in FIG. 1C, the shearing machine 6 is closed and the molten glass 4 is cut. Thereby, an ear 32 protruding outwardly of the grooves is formed around the glass optical part body portion 30.

Figure 1D:
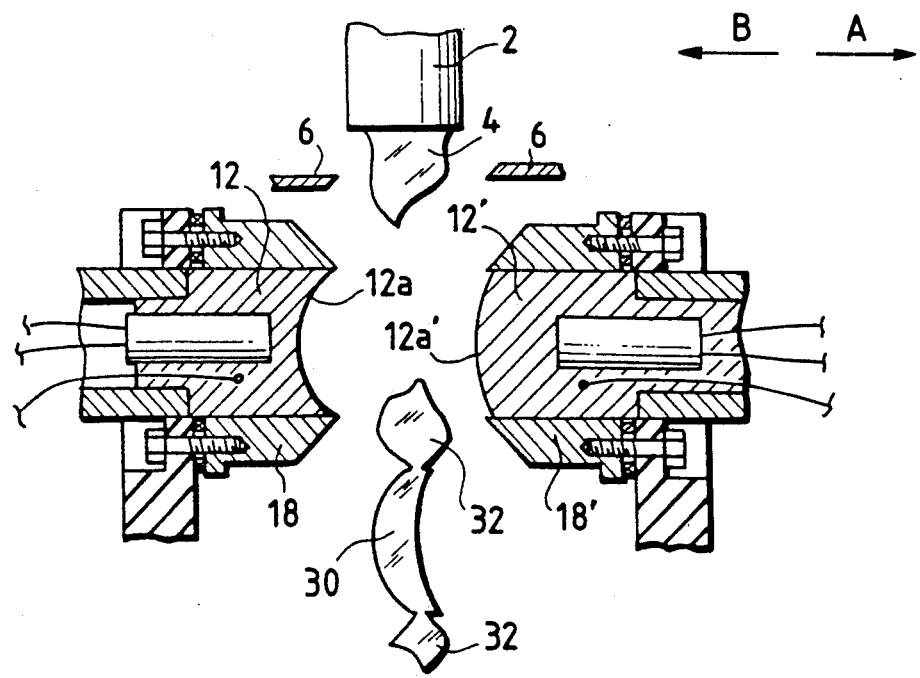

Then, as shown in FIG. 1D, the left and right mold sets are opened and further the shearing machine 6 is opened, and the molded article is removed. A take-out robot, not shown, is utilized for this removal.

Figure 2:
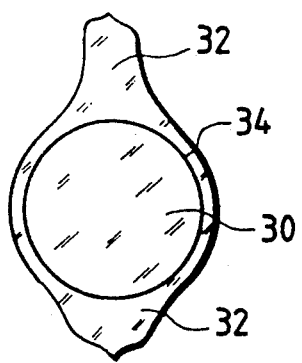
Figure 3:
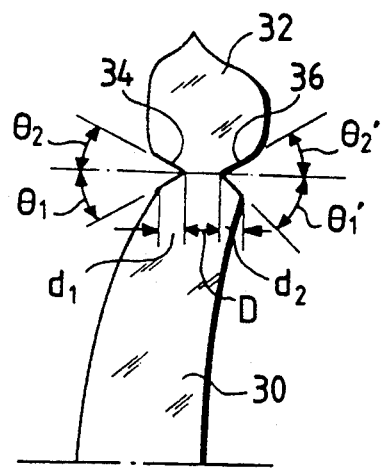

FIG. 2 is a front view showing the molded article obtained through the above-described steps, and FIG. 3 is a fragmentary schematic cross-sectional view thereof.

In these figures, the reference numeral 30 designates the optical part body portion, the reference numeral 32 denotes the ear protruding outwardly thereof, and the reference numerals 34 and 36 designate grooves formed on the opposite surfaces of the body portion 30 between the body portion 30 and the ear 32. The cross-sectional shape of the grooves is a wedge shape as shown in FIG. 3, and with respect to the direction parallel to the optic axis of the lens, the inner side and the outer side form angles $\theta_1$ and $\theta_2$, respectively, on the left surface side, and the inner side and the outer side form angles $\theta_1'$ and $\theta_2'$, respectively, on the right surface side. These angles are, for example, $\theta_1 = 30°$, $\theta_2 = 15°$, $\theta_1' = 45°$ and $\theta_2' = 15°$.

It is preferable in order to effect the break during the removal of the ear well that at least one of the depths $d_1$ and $d_2$ of the grooves 34 and 36, respectively, corresponding to the projection amounts of the ends of the groove forming rings 18 and 18', respectively, be 0.3 mm or greater. Also, it is preferable in order to effect the maintenance of shape after pressing well that the spacing D between the ends of the groove forming rings 18 and 18', i.e., the thickness of the constricted portion formed by the grooves 34 and 36 in the boundary between the body portion 30 and the ear 32, be 0.3 mm or greater. Further, it is preferable in order to effect the break during the removal of the ear well that $(d_1 + d_2)$ be ⅓ or greater of $(d_1 + d_2 + D)$.

In the above-described process, the mold members 12 and 12' are PID-controlled (proportional integral differential controlled) to a fixed point temperature on the basis of the result of the temperature measurement by the thermocouples 24 and 24', and this fixed point temperature is set to a temperature at which the molded article is cured to a viscosity at which it can be removed. The opening of the left and right mold sets shown in FIG. 1D is done after the molded article is cured to the viscosity at which it can be removed.

The molded article formed in the manner described above has its ear 32 removed thereafter.

This removal can be mechanically accomplished with ease by producing a tensile stress at a desired location because the grooves 34 and 36 are formed. That is, the ear can be removed, for example, by applying a force thereto by fingers to thereby break the ear, or by a fall shock from a slight height, or by applying a force to the ear 32 while supporting the body portion 30 by the use of a jig for exclusive use therefor.

Figure 4:
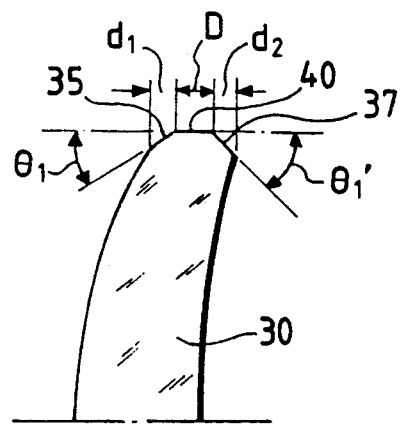

FIG. 4 is a fragmentary schematic cross-sectional view showing the optical part body portion 30 having its ear 32 removed.

As shown, the optical part body portion 30 has on the outer peripheral portion thereof inclined surfaces 35 and 37 which are parts of the grooves 34 and 36 and a broken-away surface 40 formed during the removal of the ear. The broken-away surface is formed at a desired location because during the removal of the ear, break occurs stably from the bottom of the groove 34 to the bottom of the groove 36.

The inclined surfaces 35 and 37 just perform the function as the chamfered portions of the both surfaces of the optical part body portion 30.

Figure 5:
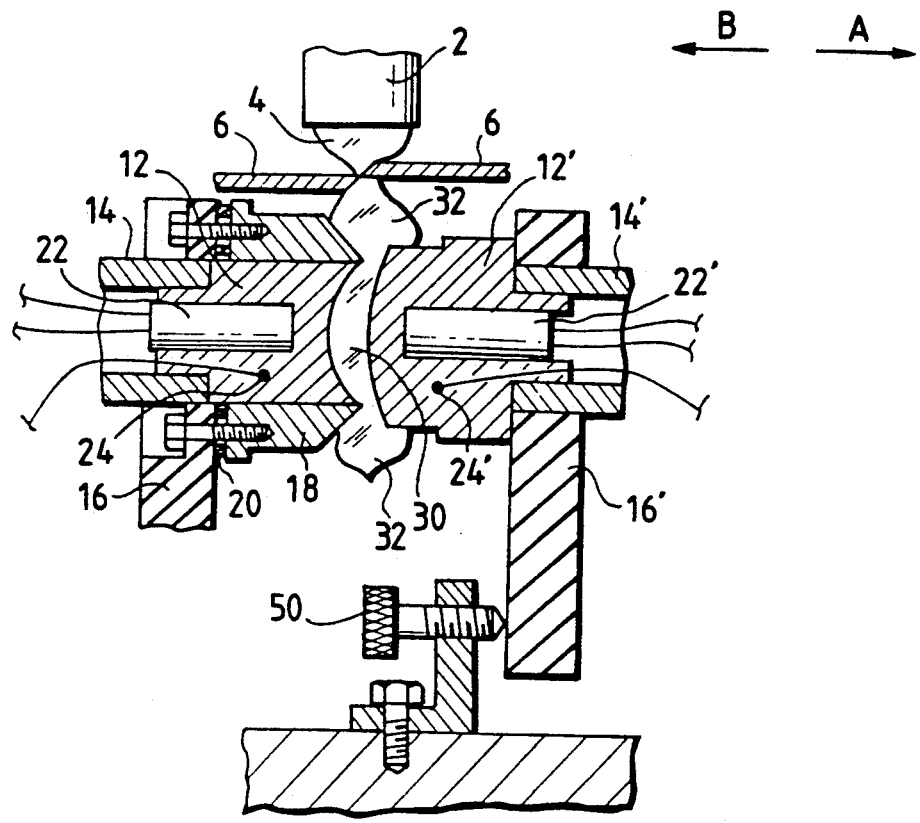

FIG. 5 is a cross-sectional view showing a modification of the above-described embodiment of the method of manufacturing a glass optical part according to the present invention. This figure corresponds to FIG. 1B, and in this figure, members similar to those in FIG. 1B are given identical reference numerals.

This modification differs from the embodiment of FIG. 1 only in that the groove forming ring is not provided around the right mold member 12' and the outer diameter of the mold member 12' is large.

Also, in FIG. 5, there is shown a stopper 50 for setting the foremost stop position of the right mold set in the direction B.

Figure 6:
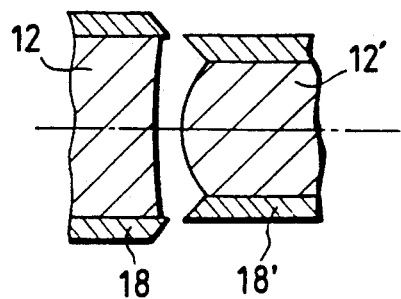
Figure 7:
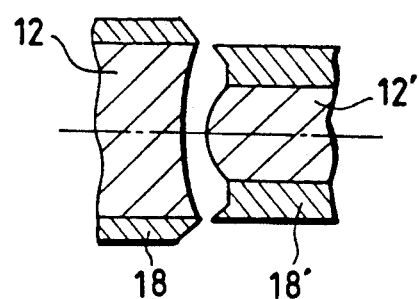

FIGS. 6 and 7 are schematic cross-sectional views showing other examples of the groove forming rings 18 and 18'.

As shown in these figures, the groove forming ring 18' of the right mold set is utilized to form a large chamfered portion of the concave surface of the optical part.

The result of the manufacture of a specific glass optical part carried out by the use of the method as described above will be shown below.

EXAMPLE 1

By the use of the apparatus as shown in FIG. 1, a convex meniscus lens of both spherical surfaces having an outer diameter of 28.8 mm$\phi$, a maximum light ray effective aperture of 27.0 mm$\phi$, a marginal thickness of 2.38 mm and a thickness difference of 0.98 mm was manufactured as follows.

The diameters of the mold members 12 and 12' were 28.8 mm$\phi$ and the projection amounts of the ends of the groove forming rings 18 and 18' were 0.45 mm.

Crown glass with a viscosity of $10^{3.7}$ poise was stabilized into a thickness of 20-22 mm and caused to flow down from the nozzle 2 made of platinum.

The press conditions were: the mold member temperature was fixed-point-controlled to 550° C., the pressing pressure was 20 kg/cm$^2$ and the pressing time was 5 seconds. Such press was continuously effected.

The ear 32 of the molded article could be easily removed by breaking it by fingers.

The thus obtained optical part body portion 30, although some drops were seen in the central portion thereof, had no surface flow and was good in its external appearance, and was sufficiently practically usable as a blank for reheat press.

EXAMPLE 2

By the use of the apparatus as shown in FIG. 5, a convex meniscus lens of both spherical surfaces having an outer diameter of 21.0 mm$\phi$, a maximum light ray effective aperture 20.0 mm$\phi$, a marginal thickness of 1.98 mm and a thickness difference of 1.42 mm was manufactured as follows:

The diameter of the mold member 12 was 21.0 mm$\phi$, and the projection amount of the end of the groove forming ring 18 was 1.30 mm.

Flint glass with a viscosity of $10^{4.5}$ poise was caused to flow down from the nozzle 2 made of platinum.

The press conditions were: the mold member temperature was fixed-point-controlled to 340° C., the pressing pressure was 50 kg/cm$^2$ and the pressing time was 5 seconds. Such press was continuously effected.

The ear 32 of the molded article could easily removed by breaking it by fingers.

The thus obtained optical part body portion 30, although some drops were seen in the central portion thereof, had no surface flow and was good in its external appearance, and was sufficiently practically usable as a blank for reheat press.

In the aforedescribed embodiments, the material of the ring member 18 and the shearing machine 6 was quenched high-speed steel.

As described above, according to the present invention, grooves are formed in the molten glass by the groove forming rings during press and a glass optical part having an ear protruding outwardly of the grooves relative to the optical part body portion is obtained, whereby during press, no dust is created and therefore it does not happen that dust adheres to the shaping surface of the mold members to deteriorate the surface accuracy and thus, there is obtained an optical part of good optical characteristic and the groove forming rings do not contact with any other metallic members and therefore, the frequency of replacement of the rings is very low, and this is advantageous in improving the manufacturing efficiency of the optical part. Also, the ear can be easily removed by breaking the grooved portion of the molded article obtained, and an optical part of a desired shape can be easily obtained.

When in the aforedescribed embodiments 1 and 2, grooves were formed under the conditions that $\theta_1=\theta_2=0°$ (no wedge) and $\theta_1'+\theta_2'=45°$ to 90° and the depth of the grooves was set to $\frac{1}{3}$ or greater of the lens thickness, the ear 32 could be cleanly cut off even though the grooves were formed only on one surface.

A second form in which the present invention is carried out will now be described.

This form proposes a method of pressing flowing-down molten glass from the opposite sides thereof by a pair of shaping mold members and manufacturing a glass optical part having a surface corresponding to the shaping surfaces of said mold members, characterized in that said glass continues to be pressed without the space between said pair of shaping mold members being closed until the glass reaches a temperature below the strain point thereof, and the flowing-down molten glass is cut above the portion thereof being pressed to thereby obtain a glass molded article having an ear protruding outwardly relative to an optical part body portion formed between said shaping mold members.

As an apparatus for this form, use is made of the apparatus for the aforedescribed first form shown in FIGS. 1 to 5.

As the mold members 12 and 12', use can be made of Ni group super-heat resisting alloy base material having its shaping surface polished to surface roughness Rmax 0.01 $\mu$m and desired shape accuracy and coated with a nitride ceramics coating layer having a thickness of about 0.8 $\mu$m. As the mold base material, use can also be made of Mo group heat resisting alloy, Fe group heat resisting alloy, stainless heat resisting alloy, Mo, Ta, carbon, carbon composite material or the like. The coating layer is used to make up for the hot strength of the base material, and besides nitrides such as BN, TiN and AlN, use can be made of carbides such as TiC, SiC and TaC, or C (diamond) and others. These can be attached by the use of various film forming techniques. The coating layer need not be a single layer, but can be provided with an intermediate layer to improve the contact strength and the heat resisting property. Also, in the case of a coating layer formed by the CVD method, treatment such as super-precision grinding or polishing can be applied thereto to provide good surface accuracy of the coating layer itself. Further, where the hot strength of the base material is great and the shape accuracy thereof can be maintained even if press shaping is effected a sufficient number of times, platinum, plutinum alloy, Ni or alloy thereof which is a soft material can be used as the coating layer.

The manufacturing process will hereinafter be described with reference to the drawings.

First, as shown in FIG. 1A, the left and right mold sets are opened at a predetermined interval and the molten glass 4 is caused to flow down from the nozzle 2 into the space between the mold members 12 and 12' while the shearing machine 6 is maintained open. Then, the arrival of the lower end of the molten glass 4 at the downstream of the space between the mold members as shown in FIG. 1A is detected by a sensor, not shown.

Subsequently, on the basis of the detection signal, the right mold set is advanced in the direction B until it bears against the stopper. With a very slight delay relative to this advancement, the left mold set is advanced in the direction A. Thereby, as shown in FIG. 1B, the molten glass is pressed correspondingly to a cavity formed by the pair of mold members 12, 12' and the pair of groove forming rings 18, 18'. At this time, as shown in FIG. 1B, the ends of the groove forming rings 18 and 18' are not in contact with each other but are spaced apart from each other by a spacing D and accordingly, on the left and right surfaces of the pressed molten glass, there are formed grooves around the portions thereof corresponding to the shaping surfaces 12a and 12a' of the mold members. Thus, a glass optical part body portion 30 is formed inside the grooves.

Subsequently, as shown in FIG. 1C, the shearing machine 6 is closed and the molten glass 4 is cut. Thereby, an ear 32 protruding outwardly of the grooves is formed around the glass optical part body portion 30.

The glass continues to be pressed until the glass temperature becomes lower than the strain point. In the meantime, the left mold set is not stopped by the stopper or the like, but continues to apply pressing pressure to the glass.

Thereafter, as shown in FIG. 1D, the left and right mold sets are opened and further the shearing machine 6 is opened, and the molded article is removed. For this removal, a take-out robot, not shown, is utilized.

As previously described, the right mold set is brought into contact with the stopper, whereafter the left mold set is advanced, whereby the cutting position of the glass flow flowing down from the nozzle can always be kept at a predetermined position.

FIG. 2 is a front view showing the molded article obtained through the above-described steps, and FIG. 3 is a fragmentary schematic cross-sectional view thereof.

In these figures, the reference numeral 30 designates the optical part body portion, the reference numeral 32 denotes the ear protruding outwardly thereof, and the reference numerals 34 and 36 designate grooves formed on the opposite surfaces of the body portion 30 between the body portion 30 and the ear 32. The cross-sectional shape of the grooves is a wedge shape as shown in FIG. 3, and with respect to the direction parallel to the optic axis of the lens, the inner side and the outer side form angles $\theta_1$ and $\theta_2$, respectively, on the left surface side, and the inner side and the outer side form angles $\theta_1'$ and $\theta_2'$, respectively, on the right surface side. These angles are, for example, $\theta_1 = 30°$, $\theta_2 = 15°$, $\theta_1' = 45°$ and $\theta_2' = 15°$.

In the above-described process, the mold members 12 and 12' are PID-controlled to a fixed point temperature on the basis of the result of the temperature measurement by the thermocouples 24 and 24'. This fixed point temperature can be suitably set and changed.

The molded article formed in the manner described above can be intactly incorporated into a lens barrel for use, or can be used with the ear 32 removed thereafter.

This removal can be mechanically accomplished with ease by producing a tensile stress at a desired location because the grooves 34 and 36 are formed. That is, the ear can be removed, for example, by applying a force thereto by fingers to thereby break the ear, or by a fall shock from a slight height, or by applying a force to the ear while supporting the body portion 30 by the use of a jig for exclusive use therefor.

FIG. 4 is a fragmentary schematic cross-sectional view showing the optical part body portion 30 having its ear 32 removed.

As shown, the optical part body portion 30 has on the outer peripheral portion thereof inclined surfaces 35 and 37 which are parts of the grooves 34 and 36 and a broken-away surface 40 formed during the removal of the ear. The broken-away surface is formed at a desired location because during the removal of the ear, break occurs stably from the bottom of the groove 34 to the bottom of the groove 36.

The inclined surfaces 35 and 37 just perform the function as the chamfered portions of the both surfaces of the optical part body portion 30.

In the press described above, the left mold set is not stopped by the stopper or the like and therefore can apply pressing pressure uniformly to the glass until the glass is cured and the final shape of the molded article is determined, whereby without any drop being created on at least one surface, the accuracy of the shaping surfaces of the mold members can be transferred to the molded article sufficiently well. The right mold set can be supported at its stopped position by a sufficiently great force so that it may not retract relative to the pressing of the left mold set.

The thickness of the molded article is determined by the viscosity of the molten glass supplied, the temperature of the mold members, the pressing pressure and other molding conditions, and a molded article of a desired thickness can be provided by suitably adjusting these. The viscosity of the molten glass supplied can be adjusted, for example, within the range of $10^6$–$10^2$ poise. The temperature of the mold members can be initially set, for example, to the range of the transition point to the strain point of the glass and thereafter be varied as required. The pressing pressure can be adjusted, for example, within the range of 1–500 kg/cm$^2$.

The thickness of the molded article can also be adjusted by varying the projection amounts of the groove forming rings 18 and 18' from the shaping surfaces 12a and 12a' of the mold members, and the greater are the projection amounts, the greater becomes the thickness of the molded article.

FIG. 5 is a cross-sectional view showing a modification of the above-described embodiment of the method of manufacturing a glass optical part according to the present invention. This figure corresponds to FIG. 1B, and in this figure, members similar to those in FIG. 1B are given identical reference numerals.

This modification differs from the embodiment of FIG. 1 only in that the groove forming ring is not provided around the right mold member 12' and the outer diameter of the mold member 12' is great.

Also, in FIG. 5, there is shown a stopper 50 for setting the foremost stop position of the right mold set in the direction B.

The result of the manufacture of a specific glass optical part carried out by the use of the method as described above will be shown below.

EXAMPLE 1

By the use of the apparatus shown in FIG. 1, but with the groove forming rings 18 and 18' removed therefrom, a concave meniscus lens of both spherical surfaces having an outer diameter of 16.0 mm$\phi$, a maximum light ray effective aperture of 14.8 mm$\phi$, a marginal thickness of 1.33 mm and a thickness difference of 0.55 mm was manufactured as follows.

The diameters of the mold members 12 and 12' were 16.0 mm$\phi$.

Dense flint glass having a transition point temperature of 455° C. and a strain point temperature of 378° C. was stabilized as a viscosity of $10^{5.1}$ poise and caused to flow down from the nozzle 2 of plantinum having an inner diameter of 15 mm$\phi$.

The press conditions were: the initial temperature of the mold members was 360° C., heating was stopped in 2 seconds after the start of press, the pressing pressure was 50 kg/cm$^2$, the pressing time was 9 seconds and thereafter, the molded article was parted from the mold, and this press cycle was continuously effected.

Thus, 600 molded articles were obtained. The opposite surfaces of the body portions of these molded optical parts are optical surfaces having no surface flaw and good in their external appearance, and the irregularity of the surface accuracy thereof was 3 newtons or less on the convex surface and was 1.5 newtons on the concave surface. Also, the irregularity of the thickness was $\pm 0.09$ mm. This is sufficiently practically usable as an optical lens.

The molded articles obtained in this example can be made into optical lenses of an ordinary shape by effecting core removing work as desired.

EXAMPLE 2

By the use of the apparatus as shown in FIG. 5, a convex meniscus lens of both spherical surfaces having an outer diameter of 21.0 mm$\phi$, a maximum light ray effective aperture of 20.0 mm$\phi$, a marginal thickness of 1.78 mm and a thickness difference of 1.42 mm was manufactured as follows.

The diameter of the mold member 12 was 21.0 mm$\phi$, the diameter of the mold member 12' was 26.0 mm$\phi$, and the projection amount of the end of the groove forming ring 18 was 1.20 mm.

Dense flint glass having a transition point temperature of 430° C. and a strain point temperature of 373° C. was stabilized as a viscosity of $10^{4.7}$ poise and caused to flow down from the nozzle 2 of platinum having an inner diameter of 15 mm$\phi$.

The press conditions were: the initial temperature of the mold members was 380° C., the glass was at 330° C. in 3.5 seconds after the start of press, the pressing pressure was 40 kg/cm$^2$, the pressing time was 14 seconds and thereafter, the molded article was parted from the mold.

The concave surface of the body portion 30 of the molded optical part thus obtained is an optical surface having no surface flaw and good in its external appearance, and the surface accuracy thereof was sufficiently as high as 1 newton or so. Also, the convex surface was of such a degree that some drops were seen in the central portion thereof. Accordingly, this optical part can be used well as a surface reflecting mirror with reflecting film formed on the concave surface thereof. Also, the optical part can be used as an optical lens with the convex surface thereof worked into better surface accuracy.

Subsequently, the variation in the thickness of the molded article was measured with the projection amount of the end of the groove forming ring 18 being varied. 100 times of molding were effected per the same projection amount. The result is shown in FIG. 8.

Figure 8:
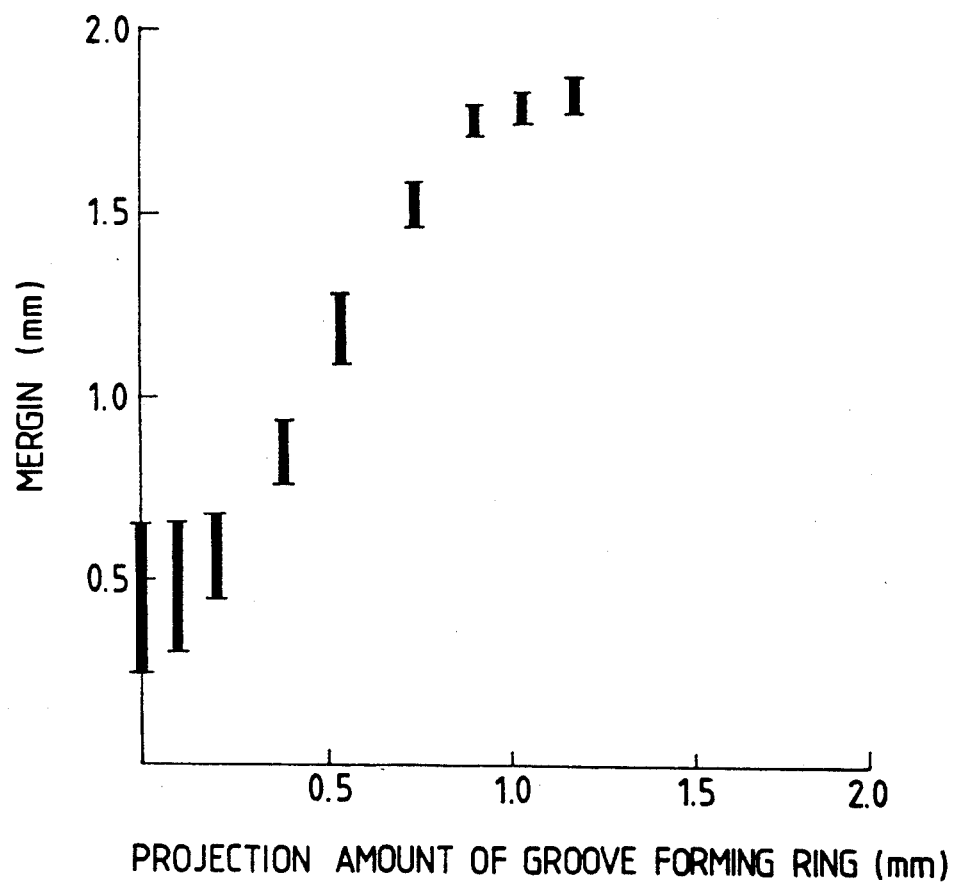
FIG. 8 shows a second form in which the present invention is carried out, and is a graph showing the result of the measurement of a variation in the thickness of a molded article obtained with the projection amount of the end of a groove forming ring varied.

As can be seen from FIG. 8, the thickness of the molded glass optical part can be adjusted by varying the projection amount of the groove forming ring 18 from the shaping surface 12a of the mold member.

EXAMPLE 3

By the use of the apparatus as shown in FIG. 1, a convex meniscus lens of both spherical surfaces having an outer diameter of 28.8 mm$\phi$, a maximum light ray effective aperture of 27.0 mm$\phi$, a marginal thickness of 2.18 mm and a thickness difference of 0.89 mm was manufactured as follows.

The diameters of the mold members 12 and 12' were 28.8 mm$\phi$, and the projection amounts of the ends of the groove forming rings 18 and 18' were 0.45 mm.

Dense crown glass having a transition point temperature of 659° C. and a strain point temperature of 602° C. was stabilized as a viscosity of $10^{3.7}$ poise and caused to flow down from the nozzle 2 of platinum having an opening of 25 mm$\times$5 mm.

The press conditions were: the temperature of the mold members was 550° C., the pressing pressure was 18 kg/cm$^2$, the pressing time was 8 seconds and thereafter, the molded article was parted from the mold.

The opposite surfaces of the body portion 30 of the molded optical part thus obtained are optical surfaces having no surface flaw and good in its external appearance, and the surface accuracy thereof was 3 newtons or less. Also, the marginal thickness of the molded optical part was within $\pm 0.05$ mm relative to the target value 2.18 mm.

In the above-described three examples, the setting of the pressing time was effected after it was measured and confirmed that the glass temperature becomes lower than the strain point during the lapse of the pressing time.

As described above, the pressing operation was continued until the glass reaches a temperature below the strain point, whereby the transfer of the shape of the molded glass lens surface by the mold members was accomplished well.

In the above-described examples, both the surfaces of the molded optical part are shown as being spherical, but of course, one or both of the surfaces can be made aspherical.

As described above, according to the present invention, the glass continues to be pressed without the space between the pair of shaping mold members being closed until a temperature below the strain point of the glass is reached, to thereby obtain a glass molded article having an ear protruding outwardly relative to the optical part body portion formed between the shaping mold members, whereby it does not happen that during the press, dust is created and adheres to the shaping surfaces of the mold members to deteriorate the surface accuracy and thus, there is provided an optical part of good optical characteristic. Also, pressing pressure can be uniformly applied to the glass until the glass is cured and the final shape of the molded article is determined, whereby the accuracy of the shaping surfaces of the mold members can be sufficiently well transferred to the molded article without any drop being created on at least one surface and thus, an optical part of a desired shape and accuracy is easily obtained.

A third form in which the present invention is carried out will hereinafter be described.

FIG. 9 is a cross-sectional view schematically showing the process of a third embodiment of the method of manufacturing a glass optical part according to the present invention and the construction of mold members.

In FIG. 9, the reference numeral 102 designates a molten glass outflow nozzle connected to a glass melting apparatus, not shown, and the reference numeral 104 denotes molten glass caused to flow down continuously from the nozzle 102. The reference numeral 106 designates a shearing machine (cutting edge) disposed just beneath the nozzle 102 for cutting the flowing-down molten glass 104 at suitable timing.

The reference numerals 112 and 112' denote a pair of shaping mold members disposed on the opposite sides of the flowing-down molten glass, and in the present embodiment, it is for shaping a convex meniscus lens whose concave surface is aspherical. The reference characters 112a and 112a' designate the shaping surfaces of the mold members 112 and 112' for forming the both surfaces of the lens. The shaping surface 112a is finished as a mirror surface, and the shaping surface 112a' is finished as a ground surface. These mold members of a rotation-symmetrical shape and are disposed coaxially with each other with their shaping surfaces opposed to each other. A pair of mold sets are constructed including the above-described mold members 112 and 112'.

The mold member 112 is of such structure that an outer piece 112-2 is slidably mounted on the outer periphery of an inner piece 112-1. The outer piece 112-2 is biased forwardly relative to the inner piece 112-1 by a compression spring 113. The outer piece 112-2 is formed with a crank-shaped guide groove 114 with which a guide pin 115 projectedly provided on the inner piece 112-1 is engaged and restrained.

As the mold members 112 (the inner piece 112-1 and the outer piece 112-2) and 112', use can be made of a shaping surface of Ni group heat resisting alloy base material grounded and finished into surface roughness Rmax 0.01 $\mu$m and a desired shape and accuracy, and coated with a nitride ceramics coating layer having a thickness of about 0.8 $\mu$m. As the mold base material, use can also be made of Mo group heat resisting alloy, Fe group heat resisting alloy, stainless heat resisting alloy, No, Ta, carbon, a carbon composite material or the like. The coating layer is used to make up for the hot strength of the base material, and besides nitrides such as BN, TiN and AlN, carbides such as TiC, SiC and TaC or C (diamond) or others can be used for the coating layer. These can be attached by the use of various film forming techniques. This coating layer need not be a single layer, but may be provided with an intermediate layer to improve the contact strength and the heat resisting property. In the case of a coating layer formed by the CVD method, treatment such as super-precision grinding or polishing can be applied to make the surface of the coating layer itself into good surface accuracy. Further, where the hot strength of the base material is great and the shape accuracy can be maintained even though press shaping is effected a sufficient number of times, platinum, platinum alloy, Ni or an alloy thereof which is a soft material can be used for the coating layer.

In the left mold set, the inner piece 112-1 of the shaping mold member 112 is mounted on a mounting member 116.

A heater 122 and a thermocouple 124 for temperature measurement are contained in the inner piece 112-1 of the mold member 112.

Although not shown, the mounting member 116 is supported for reciprocal movement in the directions of arrows A and B by a base stand, not shown. This reciprocal movement is effected by driving means, not shown.

On the other hand, in the right mold set, the shaping mold member 112' is mounted on a mounting member 116'. A groove forming ring 118' is mounted around the mold member 112' by a bolt. The end of the ring 118' is formed into the shape of a cutting edge and protrudes from the shaping surface 112a' of the mold member 112' by a suitable amount. In some cases, the groove forming ring is not mounted.

A heater 122' and a thermocouple 124' for temperature measurement are contained in the mold member 112'.

Although not shown, the mounting member 116'' is supported for reciprocal movement in the directions of arrows A and B by a base stand, not shown. This reciprocal movement is effected by driving means, not shown. However, in the right mold set, the foremost stop position in the direction B is set by a stopper, not shown. The above-mentioned stop position can be suitably set by making the position of the stopper variable and adjusting the position thereof.

The manufacturing process will hereinafter be described with reference to the drawings.

Figure 9A:
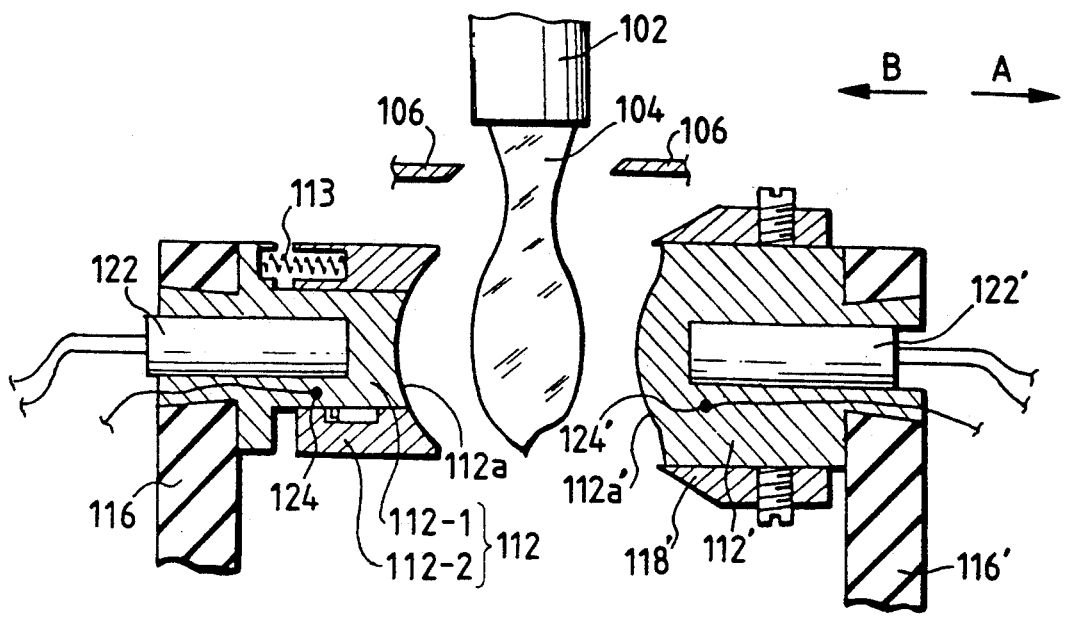
FIGS. 9A-9E, 10 show a third form in which the present invention is carried out, FIGS. 9A-9E being cross-sectional views schematically showing the steps of an embodiment of the method of manufacturing a glass optical part according to the present invention and the construction of mold members, and FIG. 10 being a front view showing a molded article.
Figure 9B:
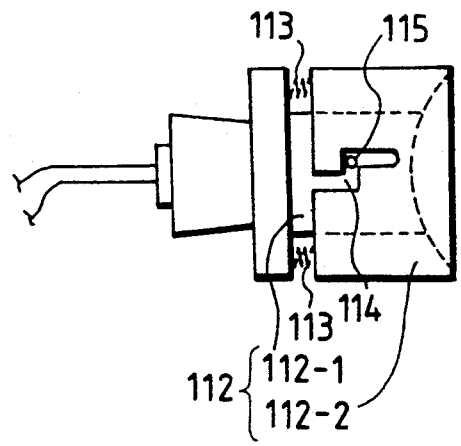

First, as shown in FIG. 9A, the left and right mold sets are opened at a predetermined interval and the molten glass 104 is caused to flow down from the nozzle 102 into the space between the mold members 112 and 112' while the shearing machine 106 is maintained open. At this time, as shown in FIG. 9B, the crank-shaped groove 114 formed in the outer piece 112-2 of the mold member 112 is engaged by the guide pin 115 projectedly provided on the inner piece 112-1, and the outer piece 112-2 is in the foremost position in the direction A relative to the inner piece 112-1. The arrival of the lower end of the molten glass 104 at the location below the space between the mold members as shown in FIG. 9A is detected by a sensor, not shown.

Figure 9C:
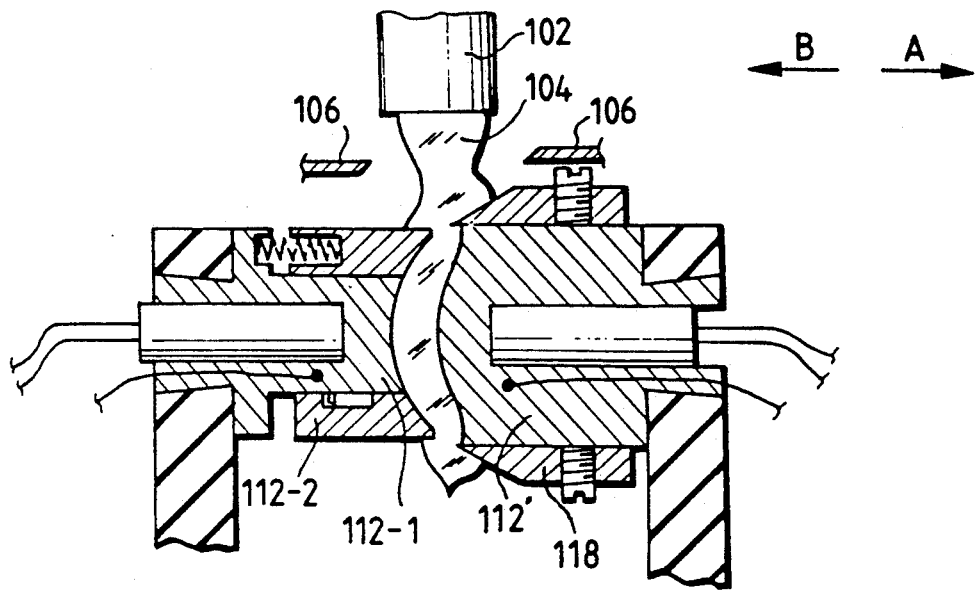

Subsequently, on the basis of the detection signal, the right mold set is advanced in the direction B until it bears against the stopper. With a very slight delay with respect to this advancement, the left mold set is advanced in the direction A. Thereby, as shown in FIG. 9C, the molten glass is pressed correspondingly to a cavity formed by the pair of mold members 112, 112' and the groove forming ring 118'. At this time, as shown in FIG. 9C, the end of the groove forming ring 118' is not in contact with the mold member 112, but is spaced apart from the latter by a suitable spacing. Also, at the initial stage of press, the viscosity of the glass is relatively low and therefore, the compression spring 113 is not compressed any further and the outer piece 112-2 is at the foremost position in the direction A relative to the inner piece 112-1.

Figure 9D:
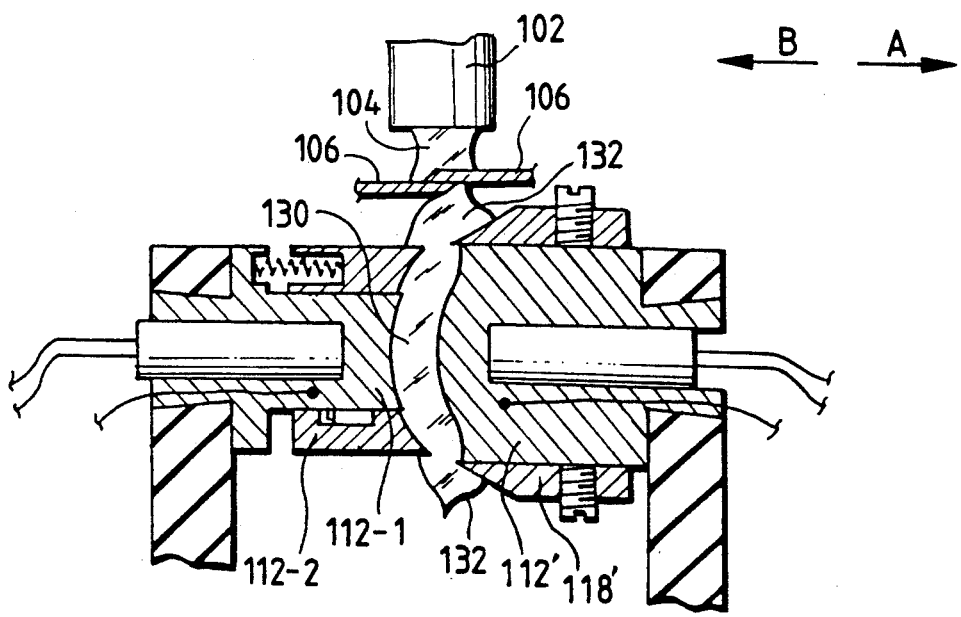

Subsequently, as shown in FIG. 9D, the shearing machine 106 is closed and the molten glass 104 is cut. Further, with the progress of press, between the mold members, the glass is cured in succession from its thinner outer peripheral portion to its central portion and therefore, the foremost position of the outer piece 112-2 is first determined, and then the inner piece 112-1 is further advanced against the force of the compression spring 113 to thereby press the uncured central portion of the glass. Thereby, sufficiently good surface accuracy is obtained without any drop being created on the surface (the spherical surface) of the molded article corresponding to the shaping surface 112a' of the mold member 112'. The pressing pressure can be initially set to a relatively low value and be gradually or stepwisely varied to relatively high values.

Thereby, there is provided a molded article of such a shape that an ear 132 formed by the groove forming ring 118' protrudes outwardly of the glass optical part body portion 130.

Press is continued until the temperature of the glass becomes lower than the strain point. In the meantime, the left mold set continues to apply pressing pressure to the glass without being stopped by the stopper or the like.

Figure 9E:
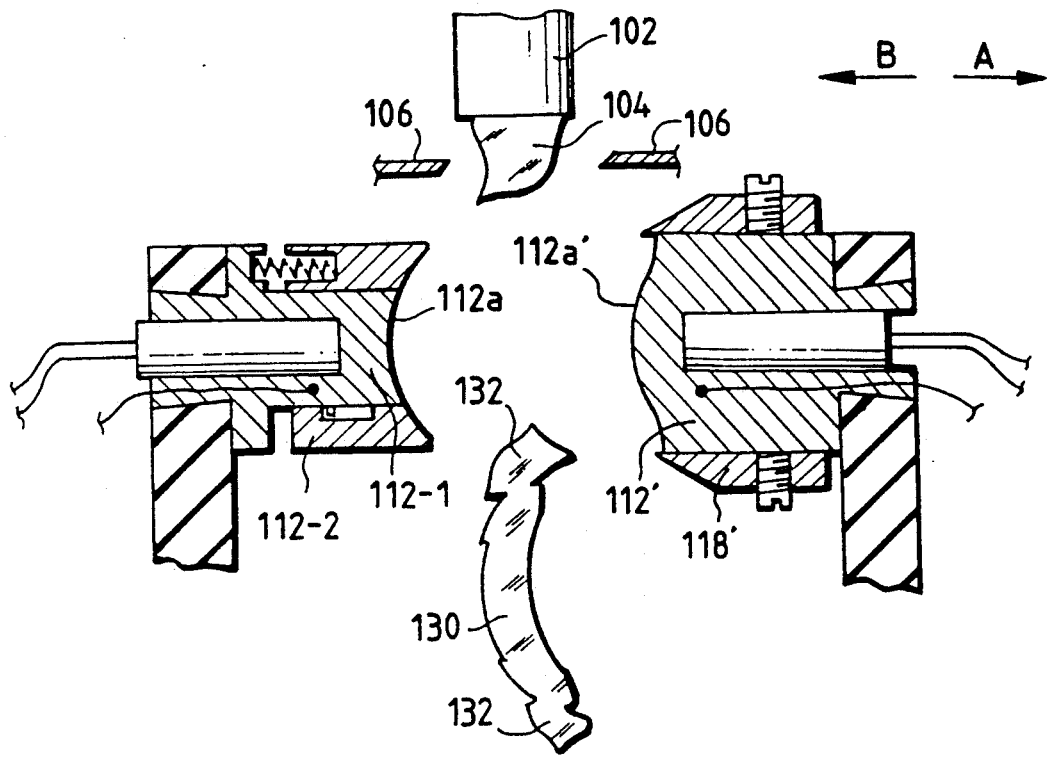

Thereafter, as shown in FIG. 9E, the left and right mold sets are opened and further the shearing machine 106 is opened, and the molded article is removed. For this removal, a take-out robot, not shown, is utilized. At this time, the outer piece 112-2 is brought back to the foremost position in the direction A relative to the inner piece 112-1 by the compression spring 113.

Figure 10:
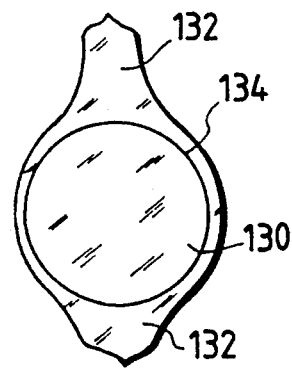

FIG. 10 is a front view showing the molded article obtained through the above-described steps.

In the above-described process, the mold members 112 and 112' are PID-controlled to a fixed point temperature on the basis of the result of the temperature measurement by the thermocouples 124 and 124'. The fixed point temperature can be suitably set and changed.

The molded article formed in the manner described above can be incorporated into a lens barrel for use without the ear 132 being removed, or can be used with the ear 132 removed.

This removal can be mechanically accomplished with ease by producing a tensile stress at a desired location because the groove 134 is formed. That is, the ear can be removed, for example, by applying a force thereto by fingers to thereby break the ear, or can be removed by a fall shock from a slight height, or can be removed by applying a force to the ear 132 while supporting the body portion 130 by the use of a jig for exclusive use therefor.

Also, the molded article formed in the manner described above can be used as a surface reflecting mirror with reflecting film being formed on the aspherical surface side thereof and without the other surface side being worked, and can be used as an aspherical lens by the other surface side being worked into a desired shape and accuracy and made into a desired thickness.

In the above-described press, the left mold set is not stopped by the stopper or the like and the inner piece 112-1 of one mold member 112 is moved at a greater stroke than the outer piece 112-2 and therefore, pressing pressure can be well applied to the glass until the glass is cured and the final shape of the molded article is determined, whereby the accuracy of the shaping surface of one mold member can be sufficiently well transferred to the molded article without any drop being created. The inner piece 112-1 and the outer piece 112-2 can be driven by discrete hydraulic cylinders, and the right mold set can be supported in its stopped position with a sufficiently great force so that it may not be retracted relative to the pressing of the left mold set.

The thickness of the molded article is determined by the viscosity of the molten glass supplied, the temperature and pressing pressure of the mold members and other molding conditions, and by suitably adjusting these, there can be provided a molded article of a desired thickness. The viscosity of the molten glass supplied can be adjusted, for example, within the range of $10^6$–$10^2$ poise. The temperature of the mold members can be initially set to the range of the transition point to the strain point of the glass and thereafter can be varied as required. The pressing pressure can be adjusted, for example, within the range of 1–500 kg/cm$^2$.

The thickness of the molded article can also be adjusted by varying the projection amount of the groove forming ring 118' from the shaping surface 112a' of the mold member 112', and the greater is the projection amount, the greater becomes the thickness of the molded article.

The result of the manufacture of a specific glass optical part carried out by the use of the method as described above will be shown below.

EXAMPLE

By the use of the apparatus as shown in FIG. 9, a convex meniscus lens whose concave surface is a rotation-symmetrical aspherical surface and having an outer diameter of 25.6 mm$\phi$, a maximum light ray effective aperture of 23.4 mm$\phi$, a marginal thickness of 1.02 mm and a thickness difference of 1.29 mm was manufactured as follows.

Dense flint glass having a transition point temperature 430° C. and a strain point temperature 373° C. was stabilized as a viscosity of $10^{4.0}$ poise and caused to flow down from the nozzle 102 of platinum having an inner diameter of 15 mm$\phi$.

The pressing conditions were: the temperature of the mold members was 330° C., the pressing pressure was initially 10 kg/cm$^2$ and 40 kg/cm$^2$ in 7 seconds after the start of press, the pressing time was 18 seconds, and when this time elapsed, the temperature of the mold members reached 360° C. and the molded article was parted from the mold.

The ear of the molded article obtained in the manner described above was removed and the shape of the convex surface side thereof was measured with a result that the accuracy of the spherical surface corresponding to the shaping surfaces of the outer piece and inner piece was as good as 2 to 3 newtons relative to the mold, and the level difference of the boundary between the inner piece and the outer piece was 2.2 $\mu$m. However, since such level difference existed in the light ray effective aperture, the grinding, lapping and polishing of the convex surface side were further effected and the core-removing work was carried out.

When the surface accuracy of the aspherical surface of the thus obtained aspherical lens was measured, it was found that the shape accuracy of the shaping surfaces of the mold members was sufficiently well transferred to said aspherical surface. Also, when the evaluation of the imaging of the aspherical lens was done, it was found that a sufficiently practical performance was obtained, and the uniformity of the refractive index of the lens was also good.

In the present embodiment, use is made of the mold member 112 whose shaping surface 112a is mirror-surface-worked to predetermined accuracy, but where the lens surface corresponding to this shaping surface is further worked after the termination of press, the shaping surface of one or both of the inner piece 112-1 and the outer piece 112-2 can be made into a rough surface.

In the above-described embodiment, there is shown a case where the molded optical part is aspherical on one surface thereof, but of course, both surfaces can be made aspherical or spherical.

As described above, according to the present invention, the molten glass continues to be pressed without the space between the pair of shaping mold members being closed until a temperature below the strain point of the glass is reached, and a glass molded article having an ear protruding outwardly of the optical part body portion formed between the shaping mold members is obtained, whereby during press, no dust is created and therefore it does not happen that any dust adheres to the shaping surfaces of the mold members to deteriorate the surface accuracy, and thus, there is obtained an optical part of good optical characteristic. Also, the pressing pressure can be uniformly applied to the glass until the glass is cured and the final shape of the molded article is determined, and particularly the plurality of constituent members of one mold member are moved at different strokes and in the course of molding, the glass in that portion thereof wherein drops may be created can be partially additionally pressed and thus, without any drop being created, the accuracy of the shaping surface of one mold member can be sufficiently well transferred to the molded article, and there can be easily obtained an optical part of a desired shape and accuracy.

We claim:

1. A method of manufacturing an optical part comprising the steps of:
    causing molten glass to flow down;
    positioning a pair of shaping mold members;
    pressing said flowing-down molten glass by moving the shaping mold members so as to approach each other and to thereby form an optical surface;
    providing a groove forming member around the shaping surface of at least one of said shaping mold members, and forming a groove in said molten glass by said groove forming member during said pressing; and
    cutting said flowing-down molten glass above a pressed portion thereof and obtaining a glass molded article having an ear protruding outwardly of said groove relative to an optical part body portion.

2. A method according to claim 1, wherein an extraneous force is applied to the optical part obtained by the method of claim 1, to thereby remove said ear.

3. A method according to claim 1, wherein said groove forming member forms upper and lower portions of said flowing-down glass, pressed by said pair of shaping mold members, into a wedge-shaped groove.

4. A method according to claim 3, wherein in the cross-section of the optical part, said groove has an angle $\theta_1$ on an inner side of a left surface side, an angle $\theta_2$ on an outer side of the left surface side, an angle $\theta_1'$ on the inner side of a right surface side, and an angle $\theta_2'$ on the outer side of the right surface side, where $\theta_1 > \theta_2$ and $\theta_1' > \theta_2'$.

5. A method according to claim 4, wherein $\theta_1 + \theta_2 < \theta_1' + \theta_2'$.

6. A method according to claim 4, wherein when the depth of the groove on the left surface side is $d_1$ and the depth of the groove on the right surface side is $d_2$ and the spacing between the ends of the grooves is D, $(d_1 + d_2) > (d_1 + d_2 + D)/3$.

7. A method of manufacturing an optical part, comprising the steps of:
    causing molten glass having a viscosity of $10^2$ to $10^6$ poise to flow down continuously;
    positioning a pair of shaping mold members for pressing the flowing-down glass so as to form at least one optical surface;
    heating the shaping mold members to a predetermined temperature and holding the shaping members at said temperature;
    pressing the flowing-down glass by moving the shaping mold members so as to approach each other;
    cutting the continuously flowing-down glass above a portion where the pressing step is being performed by the shaping mold members;
    allowing the shaping mold members to cool down;
    completing the pressing step when the glass being pressed between the shaping mold members reaches a temperature that is below the glass strain point;
    moving the shaping mold members back from each other;
    taking out a molded article having an ear that protrudes outwardly with relation to glass pressed between the shaping mold members; and
    removing the ear by applying an external force to the molded article, thereby producing the optical part,
    wherein a groove forming ring is provided around a shaping surface of at least one of the shaping mold members, whereby the groove forming ring, upon pressing, forms a groove at a boundary between a portion of the optical part and the ear protruding outwardly therefrom.

8. A glass optical part produced by the method of claim 7, wherein at least one of the at least one optical surface of the optical part is aspherical.

9. A method of manufacturing a glass optical part, comprising the steps of:
    pressing flowing-down molten glass from opposite sides thereof with a pair of shaping mold members, thereby manufacturing an optical part having surfaces corresponding to the shaping surfaces of said shaping mold members, wherein one shaping mold member of said pair is constructed of a plurality of constituent members;
    continuing to press the glass without the space between said pair of shaping mold members being reduced to its narrowest open position until the glass reaches a temperature below a strain point thereof;
    moving the plurality of constituent members of one of said pair of shaping mold members at different strokes; and
    cutting the flowing-down molten glass above that portion thereof, which is being pressed, to obtain a glass molded article having an ear protruding outwardly relative to an optical part body portion formed between said shaping mold members,
    wherein a groove forming ring is provided around the shaping surface of the other shaping mold member of said pair of shaping mold members, and a groove is formed in the molten glass by said groove forming ring during said pressing of the molten glass, wherein said ear is formed outside of said groove.

* * * * *

UNITED STATES PATENT AND TRADEMARK OFFICE
CERTIFICATE OF CORRECTION

PATENT NO. : 5,275,637
DATED : January 4, 1994
INVENTOR(S) : BUNRYO SATO, ET AL.

It is certified that error appears in the above-indentified patent and that said Letters Patent is hereby corrected as shown below:

COLUMN 5:
    Line 19, "28.8 mm$\phi$," should read --28.8 mm,--.
    Line 20, "27.0 mm$\phi$," should read --27.0 mm,--.
    Line 24, "28.8 mm$\phi$" should read --28.8 mm--.
    Line 44, "21.0 mm$\phi$" should read --21.0 mm,--.
    Line 45, "20.0 mm$\phi$," should read --20.0 mm,--.
    Line 48, "21.0 mm$\phi$," should read --21.0 mm,--.
    Line 57, "could" should read --could be--.
    Line 65, "was" should read --was made of--.

COLUMN 9:
    Line 6, "16.0 mm$\phi$," should read --16.0 mm,--.
    Line 7, "14.8 mm$\phi$," should read --14.8 mm,--.
    Line 11, "16.0 mm$\phi$," should read --16.0 mm.--.
    Line 16, "15 mm$\phi$." should read --15 mm.--.
    Line 39, "21.0 mm$\phi$," should read --21.0 mm,--.
    Line 40, "20.0 mm$\phi$," should read --20.0 mm,--.
    Line 44, "21.0 mm$\phi$," should read --21.0 mm,--.
    Line 45, "26.0 mm$\phi$," should read --26.0 mm,--.
    Line 51, "15 mm$\phi$." should read --15 mm.--

COLUMN 10:
    Line 16, "28.0 mm$\phi$," should read --28.0 mm,--.
    Line 17, "27.0 mm$\phi$," should read --27.0 mm,--.
    Line 21, "28.0 mm$\phi$," should read --28.0 mm,--.

COLUMN 14:
    Line 29, "25.6 mm$\phi$," should read --25.6 mm,--.
    Line 30, "23.4 mm$\phi$," should read --23.4 mm,--.

UNITED STATES PATENT AND TRADEMARK OFFICE
CERTIFICATE OF CORRECTION

PATENT NO. : 5,275,637
DATED : January 4, 1994
INVENTOR(S) : BUNRYO SATO, ET AL.

It is certified that error appears in the above-indentified patent and that said Letters Patent is hereby corrected as shown below:

COLUMN 15:
 Line 60, "angle $\theta_1$," should read --angle $\theta_1'$,--.
 Line 61, "angle $\theta_2$," should read --angle $\theta_2'$,--.

COLUMN 16:
 Line 37, "at least one" (second occurrence) should be deleted.

Signed and Sealed this

Twentieth Day of September, 1994

Attest:

BRUCE LEHMAN

Attesting Officer          Commissioner of Patents and Trademarks